March 30, 1937. P. W. FLEISCHER ET AL 2,075,605
MACHINE FOR COVERING BOXES AND THE LIKE
Filed Feb. 27, 1936 6 Sheets-Sheet 5

INVENTORS
PAUL W. FLEISCHER
FRANZ J. HAMMER
BY
ATTORNEYS

March 30, 1937.   P. W. FLEISCHER ET AL   2,075,605
MACHINE FOR COVERING BOXES AND THE LIKE
Filed Feb. 27, 1936   6 Sheets-Sheet 6

INVENTORS
PAUL W. FLEISCHER
FRANZ J. HAMMER
BY
ATTORNEYS

Patented Mar. 30, 1937

2,075,605

UNITED STATES PATENT OFFICE 2,075,605

MACHINE FOR COVERING BOXES AND THE LIKE

Paul W. Fleischer, Weehawken, and Franz J. Hammer, North Bergen, N. J., assignors to New Jersey Machine Corporation, Hoboken, N. J., a corporation of New Jersey Application February 27, 1936, Serial No. 65,988

10 Claims. (Cl. 93—54.2)

The invention relates to machines for applying wrappers, covers, labels or the like to boxes or their equivalent and has for its object to provide a novel arrangement whereby the combination of the covers, labels or the like with or the application thereof to the boxes or the like is effected in an efficient manner and without requiring any particular skill or supervision on the part of an operator or attendant. Other more specific objects will appear from the description hereinafter and the features of novelty will be pointed out in the claims.

Figure 1:
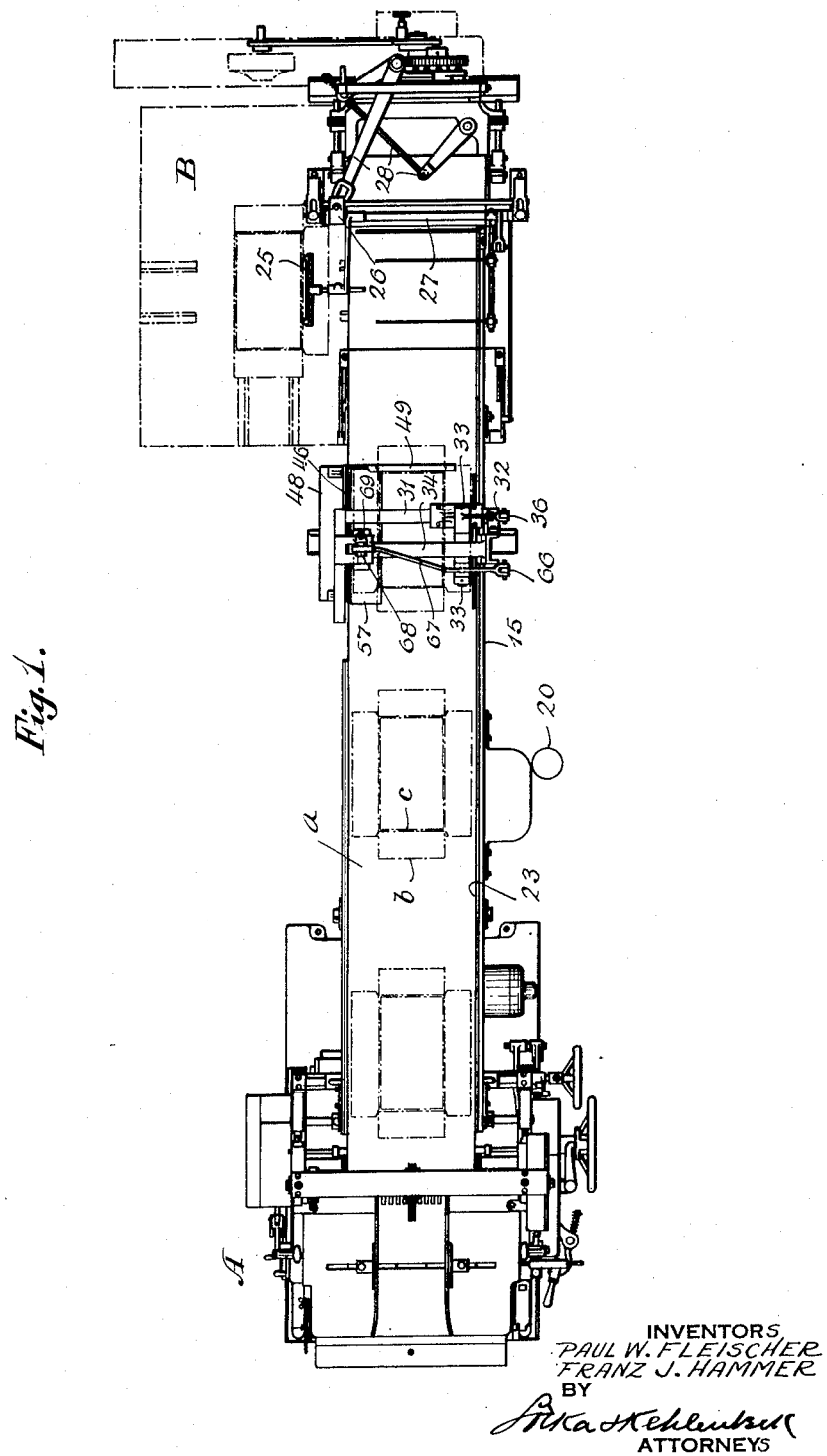
Figure 2:
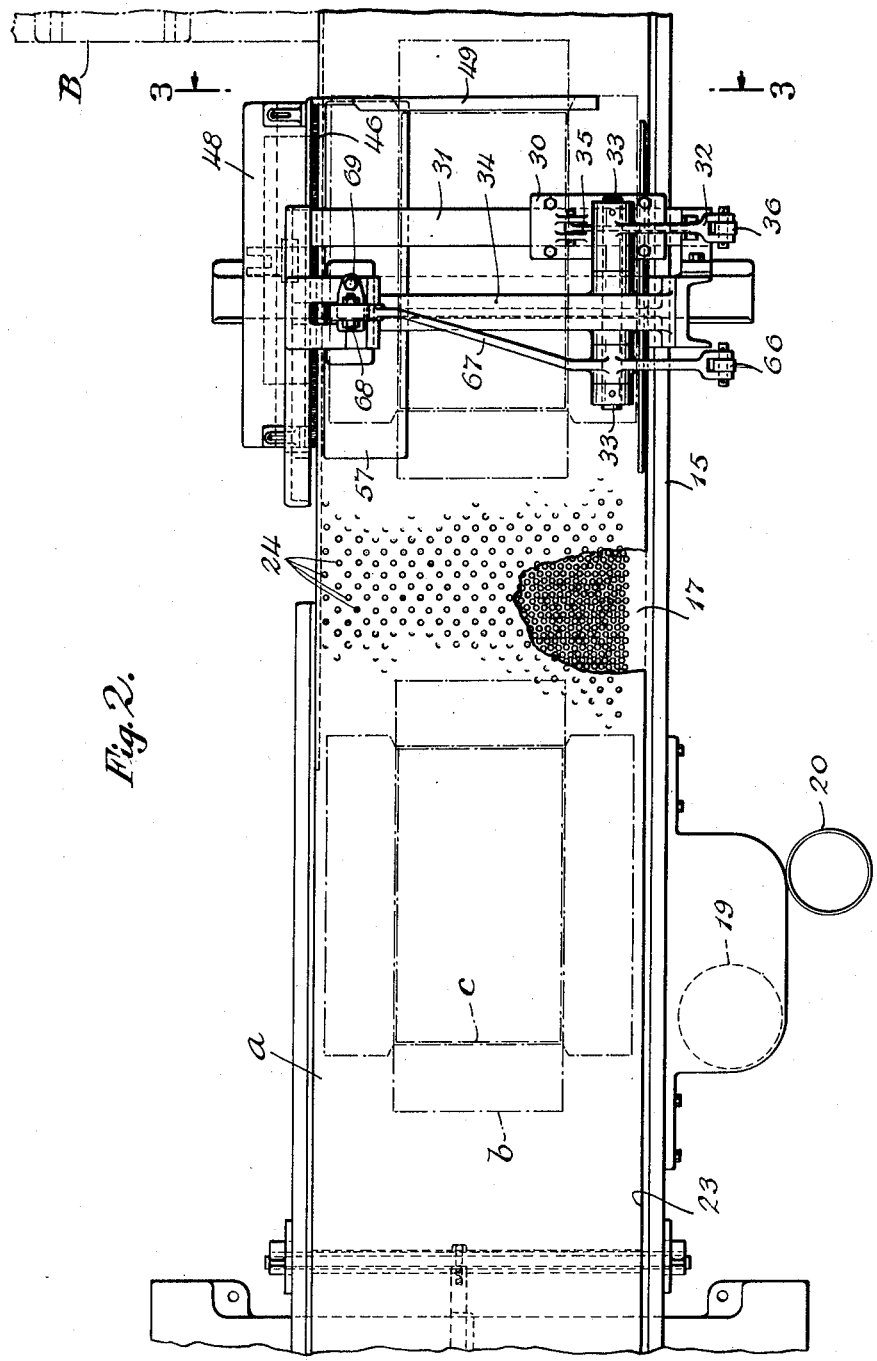
Figure 3:
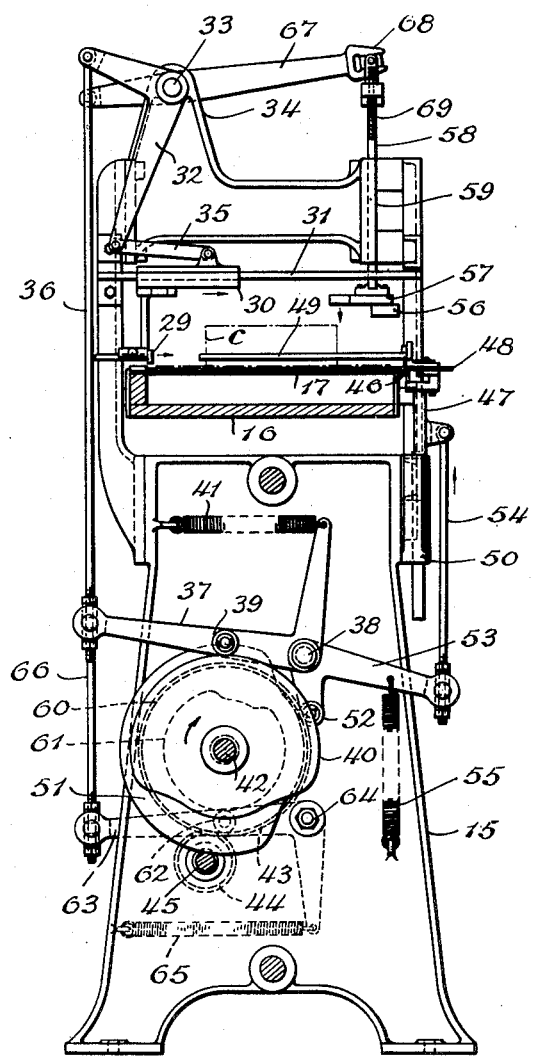
Figure 4:
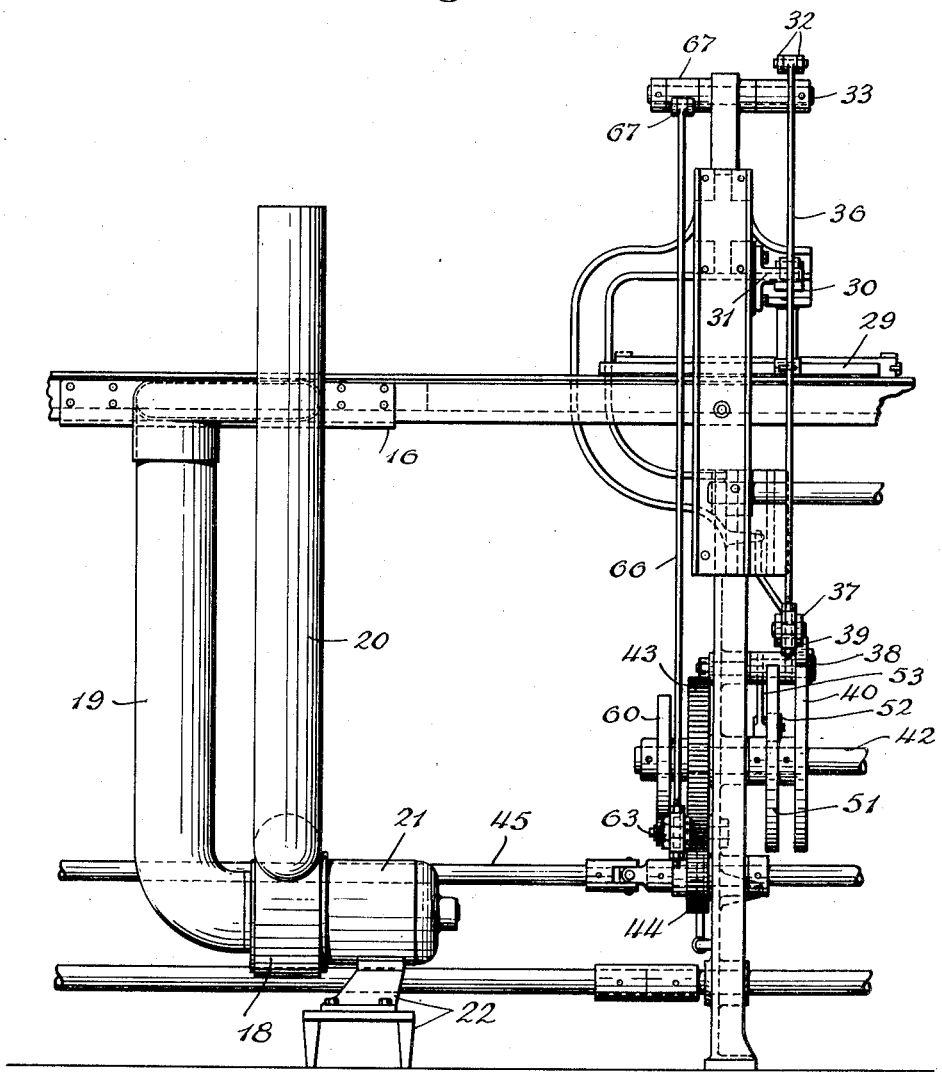
Figure 5:
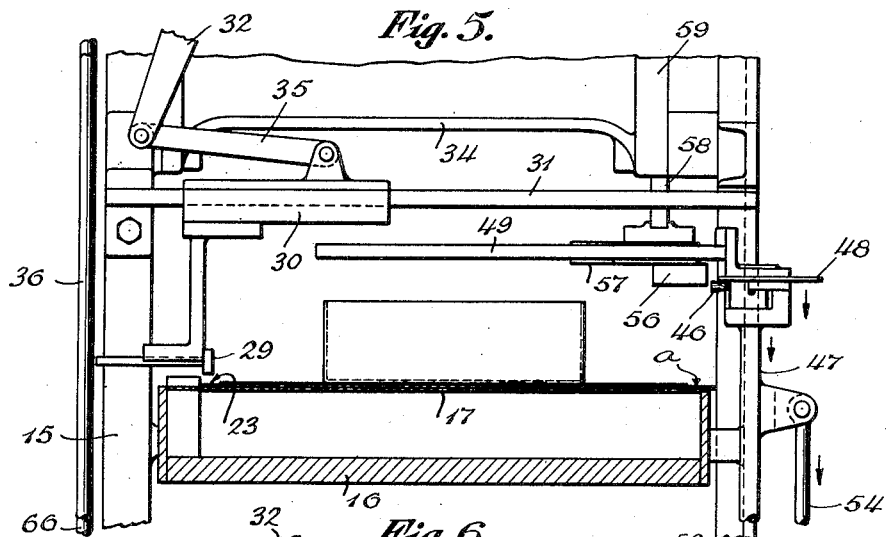
Figure 6:
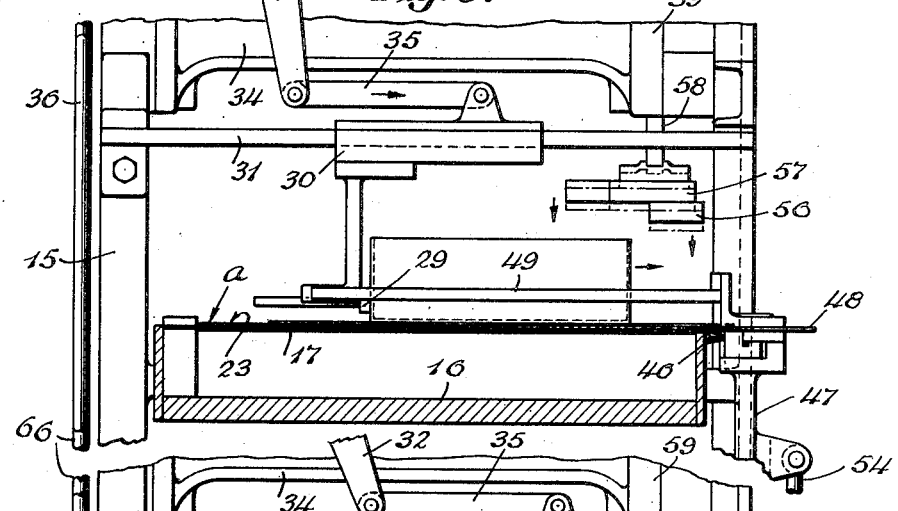
Figure 7:
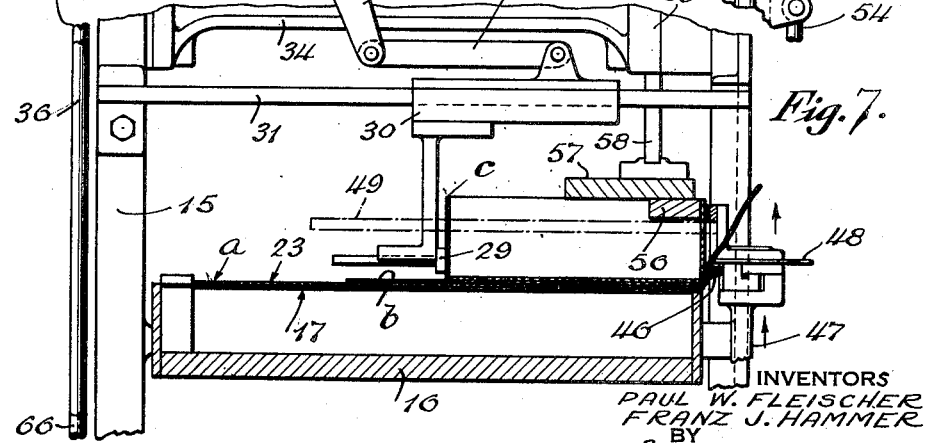
Figure 8:
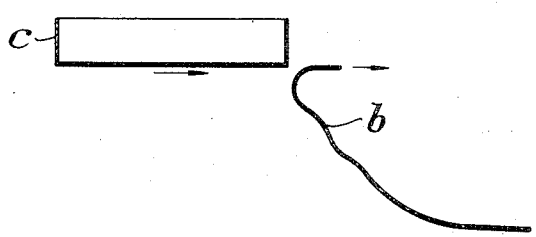
Figure 9:
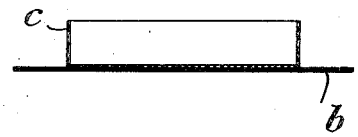

In the accompanying drawings, which illustrate an example of the invention without defining its limits, Fig. 1 is a plan view of a machine embodying the novel arrangement; Fig. 2 is a fragmentary plan view on an enlarged scale; Fig. 3 is a sectional elevation on the line 3—3 of Fig. 2; Fig. 4 is a fragmentary side elevation of the machine; Figs. 5, 6 and 7 are fragmentary sectional views illustrating operative steps of the machine; and Figs. 8 to 14 inclusive are diagrammatic views illustrating steps in the operation of combining the covers, labels or the like with the boxes or their equivalent.

For the purpose of simplifying the disclosure of the invention the terms "boxes" and "wrappers" will be used hereinafter in the description to respectively indicate the elements being combined, it being understood that this is in no sense intended to define the limits of usefulness of the novel features and that these designations are used in a broad sense to include anything which may reasonably be termed the equivalent thereof.

The machine illustrated in the drawings comprises a supporting frame 15 of suitable type and dimensions on which a suction box or chamber 16 is mounted in any convenient manner, said suction box preferably being of elongated form and provided with a flat, perforated upper wall 17. Any conventional means may be provided for developing suction in said suction box 16 as for instance a blower 18, the suction side of which communicates with a pipe 19 connected with the interior of the suction box 16, as shown in Fig. 4; the blower 18 at its outlet side may be provided with an upright flue 20 and may be operatively driven in any well-known way as by means of an electric motor 21 mounted upon a bracket and platform 22 as illustrated in Fig. 4.

The machine further includes a travelling support pervious to suction for carrying co-related elements such as wrappers and boxes and conveying the same through the machine in the performance of its operative steps, said support being illustrated in the form of an endless belt 23 provided with perforations 24 and operated intermittently in any convenient manner, the arrangement being such that the one run $a$ of said belt 23 passes over and in contact with the perforated upper wall 17 of the suction box 16; during operative periods of the machine the suction developed in the suction box 16 will accordingly be effective at the carrying surface of the support or in other words, through the perforations 24 of the upper run $a$ of the belt 23 as it travels over the perforated wall 17. In the instant machine the suction producing means as exemplified by the blower 18 and its associated elements is designed to develop only a relatively light suction at the carrying surface of the travelling support or specifically through the perforations 24 of the belt 23; that is to say, the suction effective at the upper or carrying surface of the run $a$ of the belt 23 is sufficient to flatten and hold the wrappers on the upper run $a$ of the belt 23 and to cause said wrappers to move therewith, but insufficient to materially interfere with the slidable shifting of the co-related wrappers and boxes or other elements on said surface of the run $a$ under certain conditions to be more fully pointed out hereinafter.

The path of movement of the travelling support as exemplified by the upper run $a$ of the belt 23 begins at a station A, whereat the wrappers and the boxes or their equivalent are initially brought into co-operative relation with each other. As the station A may comprise mechanism constructed and operated in any conventional manner and as the details of said station A specifically form no part of the instant invention, it is unnecessary to describe the same in detail. The aforesaid path of movement continues to a second or wrapping station B at which the final combination of the wrappers with the boxes or equivalent operation is effected. The construction and operation of the mechanism at the wrapping station B also may be of any usual and well-known type and specifically forms no part of the instant invention; the wrapping station accordingly requires no detailed description.

It is to be noted however that in the illustrated arrangement the station B is located laterally beyond the travelling support or specifically beyond the upper run $a$ of the belt 23 in receiving relation thereto, as shown in Fig. 1. Suitable means of any type is provided for shifting the boxes and wrappers laterally with respect to the belt 23, or its equivalent, to the wrapping station B in proper operative synchronism with the other operations of the mechanism. In the drawings the aforesaid means is exemplified by an operating device 25 adapted to be reciprocated in transverse operative relation to the run a of the belt 23, said device 25 being supported upon a suitable carrier 26 adapted to be slidably reciprocated on stationary guiding means 27 suitably mounted in the machine. The carrier 26 is operated in any convenient manner, for instance by means of a system of levers 28, the latter in turn being actuated by suitable mechanism adapted for the purpose. As the means described above also specifically forms no part of the invention, it is unnecessary to describe the same in any greater detail.

In the novel arrangement the wrappers or their equivalent are partially combined with or partly applied to the boxes at an intermediate point in the path of travel of the belt 23 or its equivalent, or in other words, before the wrapping station B is reached. As shown in the drawings the machine accordingly is provided with intermediate mechanism whereby this result is accomplished, said mechanism in its illustrated form consisting of a shifting or operating member 29 depending from a carrier 30 into relatively close proximity to the upper run a of the belt 23, as shown in Figs. 3, 5, 6 and 7. The carrier 30 is slidably mounted upon a stationary guideway 31 suitably mounted on the frame 15 and extending transversely to the upper run a of the belt 23, said carrier 30 being reciprocable on said guideway 31 to correspondingly reciprocate the member 29 in a path transverse to the path of travel of the upper run a of said belt 23 as illustrated in Figs. 2, 3, 5, 6 and 7. The means whereby the aforesaid reciprocation of the carrier 30 and member 29 is developed may be of any suitable type operating in properly timed relation with the other parts of the machine; in its illustrated form the means referred to consists of a bell-crank lever 32 pivoted at 33 upon a bracket 34 conveniently fixed upon the frame 15 and having its one arm connected by means of a link 35 with the carrier 30 as shown in Fig. 3. The other arm of the lever 32 is pivotally connected with one end of a vertically extending rod 36 which, at its other end, is pivotally connected with one arm of a bell-crank lever 37 as illustrated in Fig. 3. The lever 37 is pivoted at 38 upon a suitable part of the frame 15 and is provided with a roller 39 located in rolling contact with the periphery of a cam 40; in order to yieldingly maintain the roller 39 in proper engagement with the cam 40, a spring 41 has its one end connected with the other arm of said lever 37 and its other end connected with the frame 15 as shown in Fig. 3. The cam 40 is fixed upon a shaft 42 journalled on the frame 15 and driven in any convenient manner by means of a gear 43 meshing with a pinion 44 carried by a counter-shaft 45; the latter is journalled in the frame 15 and may be rotatively actuated in any well-known way to produce the desired results.

The mechanism referred to above further includes a wiping element illustrated in the form of a brush 46 projecting transversely toward the conveyor or belt 23 from a carrier 47 which also supports a folding blade 48 adjacent to and above said brush 46 as shown in Figs. 5, 6 and 7. The carrier 47 is provided with a stop in the form of a bar or rod 49 projecting horizontally over the upper run a of the belt 23 in transverse relation thereto, said carrier being slidably mounted in operative relation to one edge of the run a in an upright guideway 50 suitably fixed upon the frame 15 as shown in Fig. 3. Mechanism of suitable character is provided for vertically reciprocating the carrier 47 and its associated elements in properly timed relation with the other parts of the machine. In the illustrated example the mechanism referred to comprises a suitably profiled cam 51 fixed upon the shaft 42 and acting upon a roller 52 journalled upon one arm of a bell-crank lever 53; the latter is pivoted at 38 on the frame 15 and has its other arm connected with the carrier 47 through the medium of a link 54, said lever 53 further being influenced by a spring 55 in a manner to yieldingly maintain the roller 52 in rolling engagement with the cam 51 as illustrated in Fig. 3.

In the preferred arrangement the machine also includes a resistance member or block 56 adapted to fit into the boxes to support a wall thereof for the purpose to be more fully set forth hereinafter and carried by a plate 57 as shown in Figs. 3, 5, 6 and 7. The plate 57 is secured to and movable with a slide 58 vertically reciprocable in a guideway 59 forming part of or mounted upon the bracket 34 as illustrated in Figs. 3, 5, 6 and 7. Any convenient means may be provided for vertically reciprocating the slide 58 and its associated elements in predetermined synchronism with the co-operating parts of the machine, said mechanism in the illustrated example consisting of a disk 60 secured upon the shaft 42 and provided with a suitably shaped cam surface 61 for the accommodation of a roller 62, as shown in Fig. 3. The roller 62 is rotatably mounted upon one arm of a bell-crank lever 63 pivoted at 64 on the frame 15, the other arm of said lever 63 being acted on by a spring 65 in a manner to yieldingly maintain the roller 62 in proper operative engagement with the active surface of the cam surface 61. The means being described further includes a connecting rod 66 having its one end connected with the lever 63 and its other end connected with an arm 67 pivoted at 33 upon the bracket 34 and pivotally attached at 68 to the slide 58 as illustrated in Fig. 3. Preferably the slide 58 is provided with an adjustable stop shown in the form of a threaded member or screw 69 adapted by contact with the guideway 59 to arrest the downward movement of said slide 58 and the parts carried thereby.

Figure 10:
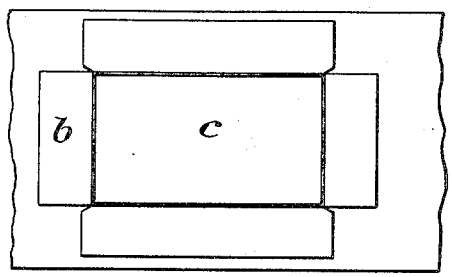
Figure 11:
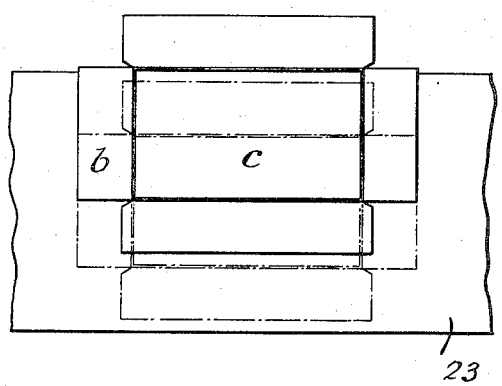
Figure 12:
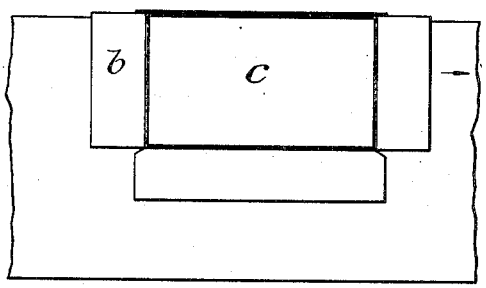
Figure 13:
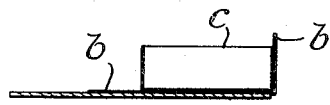
Figure 14:
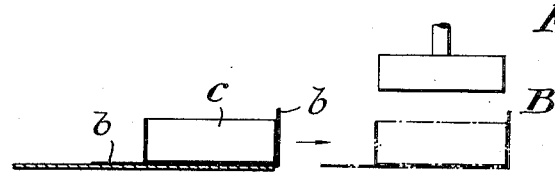

In describing the operation of the instant machine, it will be assumed that the elements involved in the performance of the operations of said machine comprise wrappers b adapted to be applied to boxes c to cover the same. The wrappers b and boxes c may be initially brought into co-operative relation with each other at the station A either by being automatically fed into co-operative relation to each other as diagrammatically illustrated in Fig. 8, or by being manually co-related. In either case when the initial co-relation is completed the co-related wrappers b and boxes c will occupy the position indicated in Fig. 9 in which the box c is located upon the wrapper b with its bottom in surface engagement with a portion of said wrapper b dimensioned and shaped to fit said bottom of the box c, said wrapper b as shown in Fig. 10 projecting beyond the sides and ends respectively of the box c in the form of side and end flaps respectively. The co-related wrappers b and boxes c are positioned upon the run a of the movable support or conveyor 23, it being understood that the suction which at this stage is developed in the suction box 16 or its equivalent is effective at the carrying surface of the conveyor 23 to hold the wrappers b upon said conveyor 23 for movement therewith; for reasons which will be more clearly pointed out hereinafter the suction effective at the carrying surface of the conveyor 23 is insufficient to materially interfere with sliding movements of the wrappers b relatively to said carrying surface of the conveyor 23. The wrappers b in the illustrated example are designed to be adhesively combined with the boxes c and accordingly are covered upon one surface with the coating of suitable adhesive. As shown in dotted lines in Fig. 2 and in solid lines in Figs. 10 and 11, the wrappers b as previously stated project beyond the opposite ends and the opposite sides of the boxes c in the form of end flaps and side flaps respectively, which at the completion of the operations are adhesively combined with the end walls and side walls of the boxes c respectively, as will appear more fully further on in the description.

As the upper run a of the conveyor 23 intermittently travels in a direction from the station A to the wrapping station B, the co-related wrappers and boxes will move with said conveyor 23 in the same direction and eventually will reach a point in the path of travel of said conveyor 23 in operative relation to the aforesaid intermediate mechanism whereby the second step in the application of the wrappers b to the boxes c is carried out. In other words, the co-related wrappers b and boxes c will be brought into engagement with the stop exemplified by the bar 49 which previously has been moved from the position illustrated in Fig. 5 to the position illustrated in Fig. 6, it being understood that the elements associated with the stop 49 are correspondingly moved in a downward direction in the illustrated example of the machine. The aforesaid adjustment of the stop 49 and its associated elements is effected by the action of the cam 51 on the roller 52 and the lever 53, the latter under the influence of the spring 55 being pivotally operated to draw the link downwardly in Fig. 3 and to correspondingly move the carrier 47 on which the stop 49 is mounted. At this stage the intermittent travel of the conveyor or belt 23 is arrested and at the same time the cam 40 permits the lever 37 to be pivotally actuated by the spring 41 in a direction to develop a downward pull on the rod 36 which is transmitted to the lever 32 and serves to pivotally rock the same on its pivot 33. This operation of the lever 32 is in turn transmitted to the carrier 30 and slidably shifts the latter on the guideway 31 toward the right in Figs. 3 and 5 and finally brings the operating member 29 into contact with the particular box c which happens to be in position at the time. As the aforesaid operations continue, the particular box c with its wrapper b will be shifted laterally to the right in Figs. 3 and 5 as indicated in Fig. 6. This movement continues until the co-related wrapper and box reach the position illustrated diagrammatically in Fig. 11 in which the one side flap of the wrapper b projects beyond the one edge of the conveyor 23. In properly timed operative relation, the cam surface 61 of the disk 60 in co-operation with the roller 62 pivotally actuates the lever 63 to shift the connecting rod 66 upwardly and to thereby rock the arm 67 on its pivot 33 to move the plate 57 downwardly and to adjust the resistance member or block 56 into the box c in engagement with the inner surface of the one side wall thereof as illustrated in Fig. 7. As the machine continues its operations the cam 51 by acting on the roller 52 will pivotally actuate the lever 53 in a direction to develop an upward movement in the link 54 which is transmitted to the slide 47 and correspondingly shifts the latter in an upward direction. This upward movement of the carrier 47 correspondingly moves the folding blade 48 and brush 46 and accordingly acts upon the projecting portion or side flap of the wrapper b in a manner to fold the same upwardly into surface engagement with the side wall of the box c as illustrated in Fig. 7. During this operative stage the wiping element or brush 46 applies the projecting portion or side flap of the wrapper b in its entirety to the side wall of the box to cause said portion of the wrapper to adhere thereto. The upward movement of the carrier 47 and its associated elements also shifts the stop 49 in an upward direction so that said stop 49 is removed from the path of the box c. In properly timed operative relation the resistance member or block 56 is moved upwardly out of the box c and the carrier 30 with the operating member 29 is slidably shifted on the guideway 31 toward the left back to the position illustrated in Figs. 3 and 5. The interrupted travel of the conveyor 23 is now resumed with the result that the next successive co-related wrapper and box will be brought into position with the intermediate mechanism just described whereupon the travel will again be arrested and the operations previously described will be repeated with respect thereto. The intermittent travel of the conveyor 23 continues to bring successive co-related wrappers and boxes into position to be acted upon by the intermediate mechanism referred to immediately above and to at the same time finally bring the co-related wrappers and boxes with the one portion or side flap of the wrappers b secured or applied to the boxes c into registry with the wrapping station B. At this point the operating device 25 is actuated in properly timed operative relation to the other parts of the machine to subsequently move the wrappers and boxes laterally in the same direction as previously mentioned with respect to the intermediate mechanism to deliver said wrappers and boxes in their partially combined condition to the wrapping station B, the mechanism of which then functions to complete the application of the wrappers to the boxes in any well-known way.

From the above description it will be clear that the elements as exemplified by the co-related wrappers b and boxes c are held upon the conveyor 23 by suction which is sufficient to hold said elements on the conveyor for movement therewith but is insufficient to materially interfere with sliding movements of said elements relatively to the carrying surface of the conveyor or its equivalent. It is thus possible to slidably shift said elements relatively to said carrying surface in a step of the operations involving the elements in question without requiring the suction to be arrested. Specifically this makes it possible to slidably shift the co-related wrappers and boxes laterally of the conveyor to project portions of the wrappers beyond an edge of said conveyor to enable said projecting portions to be applied in their entirety to the boxes, and subsequently to shift said partially combined wrappers and boxes laterally in the same direction to a wrapping station at which the application of the wrappers to the boxes is completed. Because of the fact that it is unnecessary to arrest the suction at any time during the described operations of the machine, the co-related wrappers and boxes are efficiently held in position on the conveyor during the initial application of portions of the wrappers to the boxes and during the transfer of said partially combined wrappers and boxes from the conveyor to the wrapping station.

While the machine is primarily adapted for applying wrappers or covers to boxes or the like, it obviously may be efficiently utilized in the performance of other operations as will be apparent. The machine is simple in construction and requires no particularly skilled supervision in its operation and control.

Various changes in the specific forms shown and described may be made within the scope of the claims without departing from the spirit of the invention.

We claim:

1. The combination of a travelling support pervious to suction for conveying elements in the performance of operations involving said elements, means for developing suction at the carrying surface of said support sufficient to hold said elements on said support for movement therewith but insufficient to materially interfere with sliding movements of said elements relatively to said carrying surface of the support, and means for developing a shifting force upon said elements sufficient to overcome the suction hold thereon whereby said elements are shifted upon and relatively to said surface in a step of said operations without arresting said suction.

2. The combination of a travelling support pervious to suction for conveying co-related wrappers and boxes in the performance of operations involving said wrappers and boxes, means for developing suction at the carrying surface of said support sufficient to hold said wrappers on said support for movement therewith but insufficient to materially interfere with sliding movements of said wrappers relatively to said carrying surface of said support, and means for developing a shifting force upon the co-related wrappers and boxes sufficient to overcome the suction hold on said wrappers whereby said co-related boxes and wrappers are shifted upon and relatively to said surface in a step of said operations without arresting said suction.

3. The combination of a travelling support pervious to suction for conveying co-related wrappers and boxes in the operation of combining said wrappers with said boxes, means for developing suction at the carrying surface of said support sufficient to hold said wrappers on said support for movement therewith but insufficient to materially interfere with sliding movements of said wrappers relatively to said carrying surface of said support, means for developing a shifting force upon the co-related wrappers and boxes sufficient to overcome the suction hold on said wrappers whereby said co-related boxes and wrappers are shifted upon and relatively to said surface without arresting said suction to project portions of said wrappers beyond an edge thereof and means for acting on the projecting portions of said wrappers to apply the same in their entirety to said boxes.

4. The combination of a travelling conveyor pervious to suction for conveying co-related wrappers and boxes in the operation of combining said wrappers with said boxes, means for developing suction at the carrying surface of said conveyor sufficient to hold said wrappers in engagement with said surface for movement with said conveyor but insufficient to materially interfere with sliding movements of said wrappers relatively to said carrying surface of said conveyor, means for developing a lateral shifting force upon the co-related wrappers and boxes sufficient to overcome the suction hold on said wrappers whereby said co-related wrappers and boxes are shifted laterally of and upon said carrying surface without arresting said suction to project portions of said wrappers beyond an edge of said conveyor, and means for acting on the projecting portions of said wrappers to apply the same in their entirety to said boxes.

5. The combination of a travelling conveyor pervious to suction for conveying co-related wrappers and boxes, a wrapping station located in lateral receiving relation to said conveyor, means for developing suction at the carrying surface of said conveyor sufficient to hold said wrappers in engagement with said surface for movement with said conveyor toward said wrapping station but insufficient to materially interfere with sliding movements of said wrappers relatively to said carrying surface of said conveyor, means for developing a lateral shifting force upon the co-related wrappers and boxes sufficient to overcome the suction hold on said wrappers whereby said co-related wrappers and boxes are shifted laterally of and upon said carrying surface without arresting said suction to project portions of said wrappers beyond an edge of said conveyor, means for acting on said projecting portions of said wrappers to apply the same in their entirety to said boxes, and means for subsequently moving said wrappers and boxes laterally in the same direction to deliver the same to said wrapping station for completing the application of said wrappers to said boxes.

6. In a machine for covering boxes, the combination of a suction box having a perforated wall, a movable endless conveyor for conveying co-related wrappers and boxes and provided with perforations, said conveyor being arranged to travel over and in surface proximity to the perforated wall of said suction box, a wrapping station located in lateral receiving relation to said conveyor, means for developing suction in said suction box effective at the carrying surface of said conveyor to a degree sufficient to hold said wrappers in engagement with said carrying surface for movement with said conveyor toward said wrapping station but insufficient to materially interfere with sliding movements of said wrappers relatively to said carrying surface, means for developing a lateral shifting force upon the co-related wrappers and boxes sufficient to overcome the suction hold on said wrappers whereby said co-related wrappers and boxes are shifted laterally of and upon said carrying surface without arresting the suction thereat to project portions of said wrappers beyond an edge of said conveyor, means including a brush movable perpendicularly to the plane of movement of said conveyor for applying the projecting portions of said wrappers in their entirety to said boxes, and means for subsequently moving said wrappers and boxes laterally in the same direction to deliver the same to said wrapping station for completing the application of said wrappers to said boxes.

7. In a machine for covering boxes, the combination of a suction box having a perforated wall, a movable endless conveyor for conveying co-related wrappers and boxes and provided with perforations, said conveyor being arranged to travel over and in surface proximity to the perforated wall of said suction box, a wrapping station located in lateral receiving relation to said conveyor, means for developing suction in said suction box effective at the carrying surface of said conveyor to a degree sufficient to hold said wrappers in engagement with said carrying surface for movement with said conveyor toward said wrapping station but insufficient to materially interfere with sliding movements of said wrappers relatively to said carrying surface, means for developing a lateral shifting force upon the co-related wrappers and boxes sufficient to overcome the suction hold on said wrappers whereby said co-related wrappers and boxes are shifted laterally of and upon said carrying surface without arresting the suction thereat to project portions of said wrappers beyond an edge of said conveyor, means including a brush movable perpendicularly to the plane of movement of said conveyor for applying the projecting portions of said wrappers in their entirety to said boxes, a resistance member operating in turned relation to said brush and movable into said boxes to support a wall thereof during application of the projecting portions of said wrappers to said boxes, and means for subsequently moving said wrappers and boxes laterally in the same direction to deliver the same to said wrapping station for completing the application of said wrappers to said boxes.

8. In a machine for covering boxes, the combination of a travelling conveyor pervious to suction for conveying co-related wrappers and boxes, means for developing suction at the carrying surface of said conveyor sufficient to hold said wrappers in engagement with said surface for movement with said conveyor but insufficient to materially interfere with sliding movements of said wrappers relatively to said carrying surface, a guideway extending transversely of said conveyor in parallel relation to said carrying surface, a carrier slidably mounted on said guideway, an operating member on said carrier, means for reciprocating said carrier on said guideway whereby said operating member develops a lateral shifting force upon the co-related wrappers and boxes sufficient to overcome the suction hold on said wrappers whereby said co-related wrappers and boxes are shifted laterally of and upon said carrying surface without arresting the suction thereat to project portions of said wrappers beyond an edge of said conveyor, a wiping member movable perpendicularly to the plane of movement of said conveyor in operative relation to said edge thereof, and means for reciprocating said wiping element to apply the projecting portions of said wrappers in their entirety to said boxes.

9. In a machine for covering boxes, the combination of a travelling conveyor pervious to suction for conveying co-related wrappers and boxes, means for developing suction at the carrying surface of said conveyor sufficient to hold said wrappers in engagement with said surface for movement with said conveyor but insufficient to materially interfere with sliding movements of said wrappers relatively to said carrying surface, an operating member, means for reciprocating said operating member transversely of said conveyor in operative relation thereto for shifting the co-related wrappers and boxes laterally of said carrying surface without arresting the suction thereat to project portions of said wrappers beyond an edge of said conveyor, a wiping member movable perpendicularly to the plane of movement of said conveyor in operative relation to said edge thereof, and means for reciprocating said wiping member to apply the projecting portions of said wrappers in their entirety to said boxes.

10. In a machine for covering boxes, the combination of a travelling conveyor pervious to suction for conveying co-related wrappers and boxes, means for developing suction at the carrying surface of said conveyor sufficient to hold said wrappers in engagement with said surface for movement with said conveyor but insufficient to materially interfere with sliding movements of said wrappers relatively to said carrying surface, means for shifting the co-related wrappers and boxes laterally of said carrying surface without arresting the suction thereat to project portions of said wrappers beyond an edge of said conveyor, a brush movable perpendicularly to the plane of movement of said conveyor in operative relation to said edge thereof, and means for reciprocating said brush to apply said projecting portions of said wrappers in their entirety to said boxes.

PAUL W. FLEISCHER.
FRANZ J. HAMMER.